April 29, 1930.  T. BOWLER  1,756,337

POPPET VALVE

Filed April 10, 1928

INVENTOR
THOMAS BOWLER

ATTORNEYS

Patented Apr. 29, 1930

1,756,337

UNITED STATES PATENT OFFICE

THOMAS BOWLER, OF NORTH VANCOUVER, BRITISH COLUMBIA, CANADA

POPPET VALVE

Application filed April 10, 1928. Serial No. 268,947.

My invention relates to improvements in poppet valves for reciprocating engines and the like which are particularly adapted for use in internal combustion engines and compressors where accurate seating of the valves is essential to the efficient working of the machine.

The object of the invention is to provide means whereby the valve seat automatically aligns itself to the valve, whereby leakage is overcome, and the grinding of valve seats ceases to be a frequently recurring requisite.

Figure 1:
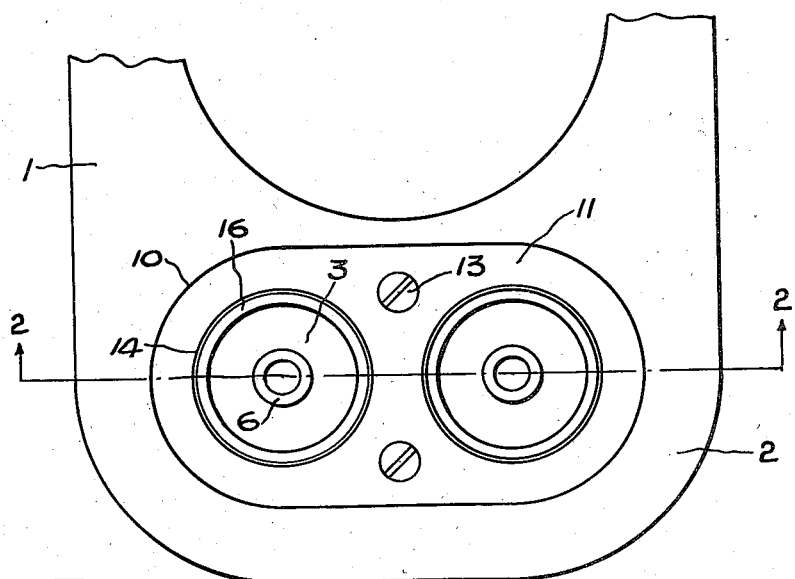

The invention consists essentially of an annular ring ground to a plane surface on one side and to a frustrum on the other, which is adapted to be movably held to the bottom wall of the valve chamber and to be engaged by the taper of a poppet valve, as will be more fully described in the following specification and shown in the accompanying drawings, in which Fig. 1 is a plan view of the invention, as fitted to an L head of a gasoline engine.

Figure 2:
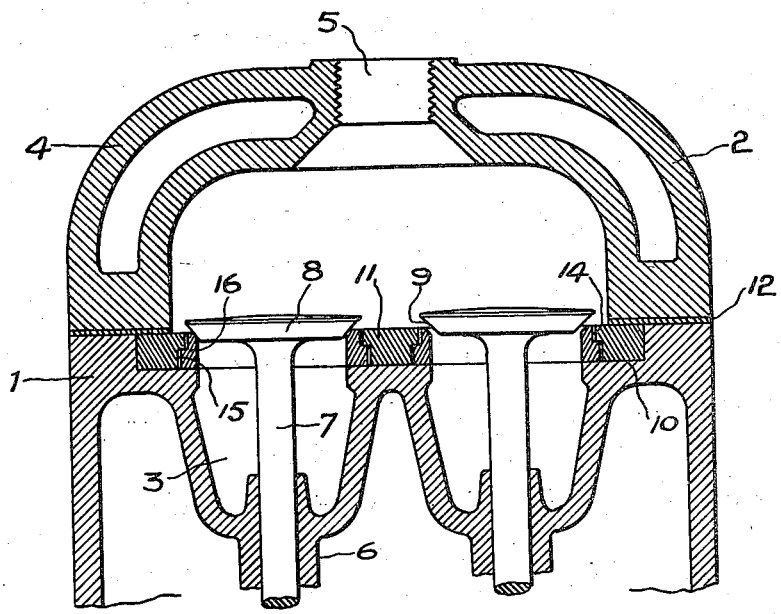

Fig. 2 is a vertical sectional view taken on the line 2—2 of Figure 1.

In the drawings like characters of reference indicate corresponding parts in each figure.

The numeral 1 indicates generally a cylinder block having an overhanging portion 2 in which valve pockets 3 are formed. The numeral 4 indicates a cylinder head having the usual orifice 5 for a spark plug, not shown.

At the base of the valve pockets 3 guides 6 are formed in which poppet valve stems 7 are slidably mounted. The valve heads 8 are of the usual type with tapered contacting faces 9. In the overhanging portion 2 of the cylinder block 1 a substantially oval recess 10 is formed which is adapted to receive a plate generally indicated by the numeral 11.

The plate 11 is fitted with its upper face flush with the face of the overhanging portion 2 and is held in position by the cylinder head 4 bearing down onto a gasket 12 in the usual manner. I may also use one or more screws 13 for the purpose of preventing buckling of the plate due to heat of combustion. Circular apertures 14 are formed in the plate 11, which are recessed on their under side as at 15 and in these apertures annular rings or valve seats 16 are fitted. The valve seats are rebated on their outer periphery to conform to the bore and recess of the apertures 14, but are of a slightly smaller diameter so that they may be moved slightly in a lateral direction. The upper inner edges of the valve seats are ground to conform to the taper of the contacting faces 9 of the valve heads 8.

Having thus described the several parts of my invention I will now briefly explain its function.

The valve seats 16 are set in position and the plate 11 tightened down by the screws 13 and the bolting down of the cylinder head 4, then as the engine is set in motion, the tapered face 9 of the valve head 8 in repeatedly striking the valve seat 16 causes it to move laterally until a true seating of the valve is obtained and an absolutely gas tight joint is formed. Should any minor leak exist between the lower face of the valve seat 16 and the face of the recess 10 of the cylinder 1, this will be filled up with carbonized oil or oil alone after a short period of running, so that such a leak will be entirely overcome.

It will thus be seen that I have invented a seating for poppet valves which is automatic in its adjustment and one which will prevent leaks and render frequent regrinding unnecessary, and whereby it becomes an extremely simple matter to substitute a new seat if desirable.

What I claim as my invention is:

1. The combination with a cylinder and a poppet valve, of a seat adapted to be held against vertical displacement and adapted for lateral displacement.

2. The combination with a cylinder and a poppet valve, of a seat and a plate adapted to clamp the seat to the cylinder, and means permitting lateral movement of the seat between the plate and the cylinder.

3. A structure of the character described comprising a cylinder having a recess and a valve opening formed in the bottom wall of said recess, an apertured plate positioned in said recess, a detachable valve seat held to the bottom wall of the recess by means of said plate but capable of lateral displacement and a valve cooperating with said seat.

4. A structure of the character described comprising a cylinder provided with a recess and a valve opening formed in the bottom wall of said recess, a valve seat element positioned in said recess and surrounding the valve opening, an apertured plate also positioned in said recess and serving to retain the valve seat element engaged with the bottom wall of the recess, a cylinder head secured to the cylinder in such manner as to retain the apertured plate in said recess and a valve cooperating with said seat.

Dated at Vancouver, B. C., this 28th day of March, 1928.

THOMAS BOWLER.